United States Patent [19]

Bartasis et al.

[11] Patent Number: 4,920,575
[45] Date of Patent: May 1, 1990

[54] PROTECTIVE GARMENT MATERIAL AND CONSTRUCTION

[75] Inventors: James E. Bartasis, Gurnee; Richard L. McIntire, Winnetka, both of Ill.

[73] Assignee: Bodigard Technologies, Inc., Buffalo Grove, Ill.

[21] Appl. No.: 298,828

[22] Filed: Jan. 18, 1989

Related U.S. Application Data

[63] Continuation of Ser. No. 920,361, Oct. 20, 1986, abandoned.

[51] Int. Cl.⁵ .................. A62B 17/00; A41D 27/24
[52] U.S. Cl. ............................ 2/2; 2/243 A; 2/275
[58] Field of Search ........... 428/516, 620; 2/2, 2.1 R, 2/2.1 A, 243 A, 275

[56] References Cited

U.S. PATENT DOCUMENTS

| | | | |
|---|---|---|---|
| 2,981,954 | 5/1961 | Garbellano | 2/2.1 R |
| 3,294,617 | 12/1966 | Way | 2/2.1 R |
| 3,560,325 | 2/1971 | Sogi et al. | 161/165 |
| 3,620,435 | 11/1971 | Sogi | 229/3.5 R |
| 3,882,259 | 5/1975 | Nohara et al. | 428/35 |
| 4,082,854 | 4/1978 | Yamada et al. | 426/106 |
| 4,190,010 | 2/1980 | Bibby | 2/275 X |
| 4,272,851 | 6/1981 | Goldstein | 2/79 |
| 4,522,203 | 6/1985 | Mays | 428/287 X |
| 4,555,293 | 11/1985 | French | 264/248 X |
| 4,724,185 | 2/1988 | Shah | 428/516 X |
| 4,789,575 | 12/1988 | Gibbons et al. | 428/516 X |
| 4,792,488 | 12/1988 | Schirmer | 428/516 X |
| 4,818,592 | 4/1989 | Ossian | 428/516 X |

FOREIGN PATENT DOCUMENTS

| | | | |
|---|---|---|---|
| 1306990 | 9/1962 | France | 2/2.1 R |
| 1476661 | 3/1967 | France | 2/2.1 R |
| 2139948 | 11/1984 | United Kingdom | 428/520 |
| 8303205 | 9/1983 | World Int. Prop. O. | |

*Primary Examiner*—Werner H. Schroeder
*Assistant Examiner*—Sara M. Current
*Attorney, Agent, or Firm*—Willian Brinks Olds Hofer Gilson & Lione

[57] ABSTRACT

A protective garment made of material which includes a high barrier, multi-layer film incorporating EVOH laminated to a spun bonded polyester substrate. The film is a five layer construction with a layer of EVOH in the middle, bracketed by water resistant bonding resin layers and outer layers of polyethylene or polyester. The substrate is formed with low temperature binders and is calendered on both sides, the outer side being calendered much more extensively than the inner side. The material is joined together at pattern edges by thermal bonding under pressure or by a strip of the film thermal bonded to material segments.

13 Claims, 1 Drawing Sheet

PROTECTIVE GARMENT MATERIAL AND CONSTRUCTION

This application is a continuation of application Ser. No. 06/920,361, filed Oct. 20, 1986.

FIELD OF THE INVENTION

This invention is in the field of protective garments. It relates particularly to disposable garments fabricated of synthetic, thermoplastic materials.

BACKGROUND OF THE INVENTION

Many synthetic, cloth-like materials are used in protective garments of one type or another. These materials are conventionally thermoplastic and formed in woven and non-woven configurations. These synthetic cloth-like materials include "Tyvek" which is a trademark of E. I. Du Pont de Nemours and Co., Wilmington, Del. 19898; "Duraguard" and "Safeguard" which are trademarks of Kimberly Clark Corp., Roswell, Ga. 30076; "Celestra" which is a trademark of Crown Zellerback Corp., Washougal, Wash. 98671; and "Duralace" which is a trademark of Chicopee Manufacturing Co., Chicopee, Ga. 30501. These materials are utilized as substitutes for cloth and pulp-paper in disposable clothes for medical, industrial and retail markets, as well as for other purposes.

In addition to the foregoing, laminated materials comprising a film and a substrate are also known in protective garments. As described in Goldstein U.S. Pat. No. 4,272,851, materials such as "Tyvek" are conventionally laminated to a film of polyethylene, for example, and made into protective garments.

SUMMARY OF THE INVENTION

It is an object of the present invention to provide an improved material for disposable protective garments.

Another object is to provide an improved laminated material for disposable protective garments.

Still another object is to provide an improved protective garment material which is stronger, more durable, and affords greater hazardous environment protection than materials presently available.

Yet another object is to provide a new and improved protective garment construction.

BRIEF DESCRIPTION OF THE DRAWINGS

The invention, including its construction and method of fabrication, is illustrated more or less diagrammatically in the drawing, in which.

DESCRIPTION OF THE PREFERRED EMBODIMENTS

Figure 1:
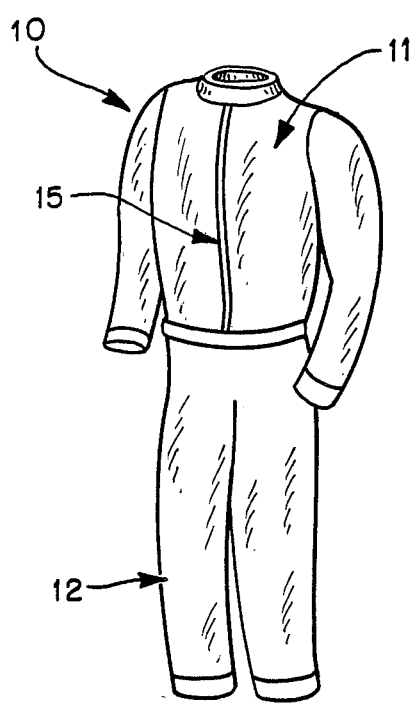
FIG. 1 is a front elevational view of a protective garment embodying features of the present invention.

Referring now to the drawing, and particularly to FIG. 1, a protective garment embodying features of the invention is illustrated generally at 10. The garment 10 is of the type which might be worn by a worker in a hazardous chemical environment, for example. The garment 10 is fabricated of a synthetic, cloth-like material 11 also embodying features of the present invention.

The material 11 is made up of pattern segments 13 preferably bonded along seams 12 by a thermal-bonding process described in French U.S. Pat. No. 4,555,293. For reasons which will hereinafter be discussed, the material 11 is particularly well suited for this bonding process.

The garment includes a conventional zipper strip 15. The strip 15 may also be bonded to segments 13 of the material 11. The zipper strip 15 opens and closes in a conventional manner to permit the wearer to get in and out of the garment 10.

Figure 2:
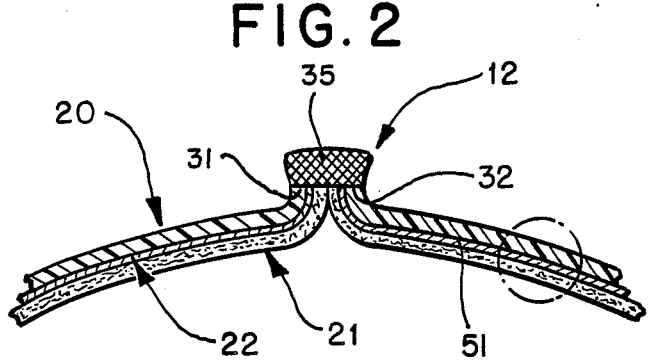
FIG. 2 is an enlarged, sectional view through a portion of the garment shown in FIG. 1, illustrating the material composition and the garment construction at a seam.

Referring now to FIG. 2, an enlarged cross-section of a portion of the garment 10 is illustrated, at a seam 12 between segments 13. The garment material 11 comprises an outer film 20 of a synthetic material manufactured and sold by the British Petroleum Corporation. The film 20 is laminated to an inner substrate 21 of spun-bonded polyester material. A layer 22 of adhesive is provided between the film 20 and the substrate 21 to enhance the bond between them.

FIG. 2 also shows two adjoining edges 31 and 32 of the segments 13 of material 11 bonded together at a seam 12. As has been pointed out, the seam bond, which is here identified generally at 35, is a thermal bond created by the application of pressure and heat in the manner described in the French patent.

Figure 3:
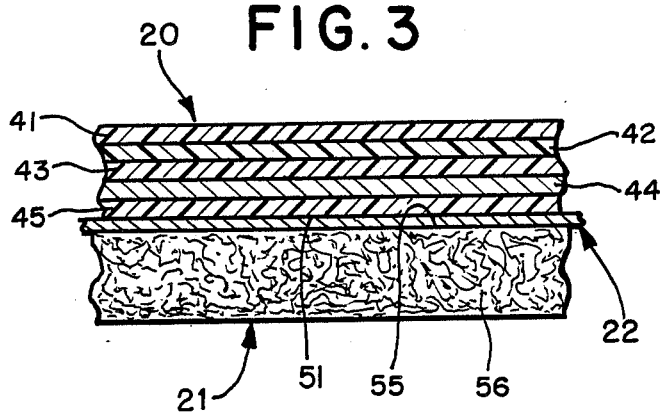
FIG. 3 is a further enlarged sectional view of the circled portion of the material illustrated in FIG. 2.

The film 20 is a five-layered product. As seen in FIG. 3, which is a greatly enlarged cross-section of a segment of the garment material 11 encircled in FIG. 2, the film comprises five discrete layers 41, 42, 43, 44, and 45.

The first or inner layer 41 of the film 20 s a polyethylene layer. The second layer 42 is a "tie layer" of water resistant adhesive resin. The third or center layer is ethylene vinyl alcohol, (EVOH), chemically written as:

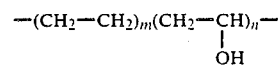

The fourth layer 44 is another layer of water resistant adhesive resin. The fifth, or outer, layer 45 is another layer of polyethylene.

The film 20 has been described in terms of its inner layer 41 and its outer layer 45 being polyethylene. Either or both may also be a polyester according to the present invention, however. In either case the film 20 is a five layer (at least) high barrier film which contains a center layer of EVOH.

According to the invention, the film 20 is "Corona" treated before being combined with the substrate 21. This involves electronically pitting one surface 51 of the film 20 by a "Corona" process well known in the art. This is done to make the film 20 adhere better to the substrate 21 when they are laminated.

The substrate 21 is a spun-bonded polyester material incorporating low temperature binders. The binders may be ethyl vinyl acetate (EVA), or polyvinyl acetate (PVA), for example.

While the substrate 21 is formed, by HDK Industries, Inc., Rogersville, Tenn., using conventional methods, it is calendered on both sides 55 and 56. The side 56 which will be exposed in the garment material 11 is extensively calendered by rolling to press all loose fiber ends into the surface 56 and avoid subsequent "linting". The side 55, which is to adhere to the film 20, is calendered only approximately 70% of the amount of calendering used on side 56, an amount sufficient to provide cross-machine strength to the substrate.

The film 20 and the substrate 21 are laminated with the adhesive layer 22 between them. The adhesive layer 22, which is an ethyl vinyl acetate (EVA) resin, is a thin layer applied to the film 20 before lamination.

In practice, a film 20 of two and one-half mils thickness is employed with a two ounce spun bound polyester material substrate 21. The lamination process completes the fabrication of a material 11 having very high barrier characteristics, excellent strength, and structure extremely well suited for thermal bonding to form the seams 12.

As seen in FIG. 2, the thermal bond 35 is formed at edges 31 and 32 of material 11 pattern segments. The thermal pressure bonding process described in the French patent is made particularly effective by the low temperature binder resins in the substrate 21.

Figure 4:
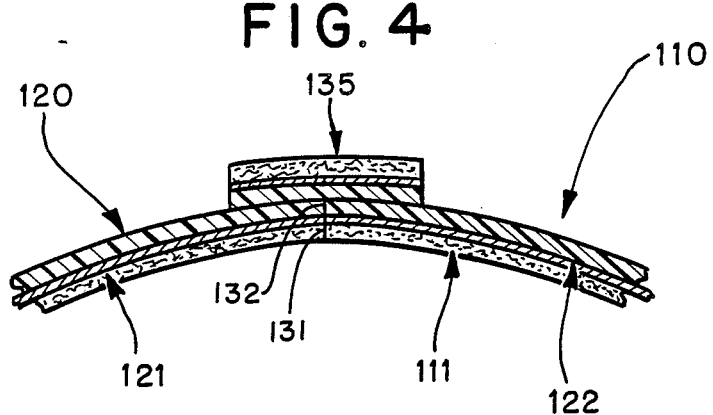
FIG. 4 is a view similar to FIG. 2 showing another form of seam in a garment construction embodying features of the invention.

Referring now to FIG. 4, a portion of a garment embodying another feature of the invention is illustrated at 110. The garment 110 is made up of material 111 identical to the material 11 hereinbefore discussed. However, the seam 112 is created in a different manner.

The seam 112 is made by placing the two edges 131 and 132 into abutting relationship. The film 120, which is identical to the film 20 hereinbefore discussed, is on the outside of the garment material 111. According to the invention a narrow strip 135 of the same material as the garment material 111 is placed over the abutting material edges 131 and 132 with its film side down. The film strip 135 is then thermal bonded to the film 120 over the abutting edges 131 and 132.

The thermal bonding of the strip 135 is carried out in the following manner. The strip 135 is heated by passing it over a Teflon roller heated to approximately 200° F. It is pressed against the Teflon roller by a urethane roller under a pressure of four psi. Air is heated to approximately 440° F. and blown in a fine jet point where the strip 135 and the abutting edges 131 and 132 come together, between the strip and the material 111, before it passes between the rollers.

A bond is formed between the strip 135 and the abutting film 120 segments. The seam bond at the strip 135 is of high strength and durability. It is impervious to the hazardous environment. It requires no other thermal bonding (or sewing) of the edges 131 and 132 directly to each other.

I claim:

1. A protective garment for hazardous chemical environments, comprising:
   (a) two or more adjacent segments of material having adjacent edges;
   (b) each of said material segments including a multi-layer film made of polymeric substance and having an intermediate EVOH layer, a polymer layer on each side of said EVOH layer, and a water resistant resin tie means between said polymer layers and said EVOH layer;
   (c) each of said material segments also including a substrate;
   (d) said film and said substrate being laminated together;
   (e) said garment further comprising a strip of said multi-layer film;
   (f) said adjacent segments being joined at said edges by placing said strip of film above said edges and bonding said strip of film to said adjacent segments to create a substantially moisture-impervious seam between said segments;
   (g) said garment being effective to protect a worker in a hazardous chemical environment while retaining its chemical resistance properties in the presence of moisture.

2. The protective garment of claim 1 further characterized by and including:
   (a) an adhesive layer between said film and said substrate.

3. The protective garment of claim 1 further characterized in that:
   (a) said substrate has at least one calendered surface.

4. The protective garment of claim 1 further characterized in that
   (a) a thermal bond is formed between at least two of said adjacent segments and a strip of film over said adjacent edges.

5. A protective garment for hazardous chemical environments, comprising:
   (a) at least two garment segments fabricated of laminated material and having adjacent edges;
   (b) said material of each segment including a film made of synthetic, organic substance which acts as a hazardous chemical barrier, and a substrate;
   (c) said film including at least three separate layers of synthetic, organic substance with an intermediate one of said layers being formed of EVOH and the other layers being made of different synthetic materials; and
   (d) water resistant tie means between said EVOH layer and said other layers;
   (e) said garment further comprising a strip of said film made of synthetic, organic substance;
   (f) said garment segments being joined at said adjacent edges by placing said strip of film above said edges and bonding said strip of film to said adjacent segments to create a substantially moisture-impervious seam between said segments;
   (g) said garment being effective to protect a worker in a hazardous chemical environment while retaining its chemical resistance properties in the presence of moisture.

6. The protective garment of claim 5 further characterized by, and including:
   (a) means forming a thermal bond with said adjacent edges.

7. The protective garment of claim 5 further characterized in that:
   (a) said film includes five separate layers of synthetic, organic substance, including a center layer formed of EVOH, two bracketing intermediate layers of a water resistant resin, and two outer layers;
   (b) said outer layers being polyolefins.

8. The protective garment of claim 5 further characterized in that:
   (a) said strip of film further comprises said substrate;
   (b) said film composition being substantially the same as the film in said material
   (c) said strip being pressed against said segments with corresponding films facing each other and a heat seal being formed between them.

9. The protective garment of claim 5 further characterized in that:
   (a) said substrate is a non-woven material.

10. The protective garment of claim 9 further characterized in that:
 (a) said non-woven substrate has at least one calendered face.

11. The protective garment of claim 5 further characterized in that:
 (a) said material includes an adhesive layer between said film and said substrate.

12. A protective garment for hazardous chemical environments, comprising:
 (a) at least two garment segments fabricated of laminated material having adjacent edges;
 (b) said material of each segment including a film made of polymeric substance which acts as a hazardous chemical barrier, and a substrate; and
 (c) means forming a thermal bond with said adjacent edges;
 (d) said thermal bond means utilizing a strip including said film made of polymeric substance which acts as a hazardous chemical barrier, and said substrate;
 (e) said strip being pressed against said segments with corresponding films facing each other and a heat seal being formed between them.

13. The protective garment of claim 12 further characterized in that:
 (a) said strip film is the same composition as said segment material film.

* * * * *